(12) United States Patent
Beadle et al.

(10) Patent No.: US 6,324,687 B1
(45) Date of Patent: Nov. 27, 2001

(54) METHOD AND APPARATUS TO SELECTIVELY CONTROL PROCESSING OF A METHOD IN A JAVA VIRTUAL MACHINE

(75) Inventors: Bruce Anthony Beadle, Round Rock; Michael Wayne Brown, Georgetwon; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,512

(22) Filed: Dec. 3, 1998

(51) Int. Cl.[7] ....................................................... G06F 9/45
(52) U.S. Cl. ............................................................... 717/6
(58) Field of Search ..................................................... 717/6

(56) References Cited

U.S. PATENT DOCUMENTS

| | | | |
|---|---|---|---|
| 5,848,274 | * | 12/1998 | Hamby et al. .............................. 717/5 |
| 6,078,744 | * | 6/2000 | Wolczko et al. .......................... 717/5 |
| 6,110,226 | * | 8/2000 | Bothner .................................... 717/7 |
| 6,139,199 | * | 10/2000 | Rodriquez ................................ 717/9 |

OTHER PUBLICATIONS

Asymetrix Corp., Asymetrix SuperCede Java Edition, Internet Search, 9–11, 1996.*
Somogyi et al., Java Finally Delivers, Apr. 9, 1998, Mack/ord Reviews, pp. 1–5.*
Olin, Inside The Java Virtual Machine, 1996, Que Corp., pp. 1–2.*

* cited by examiner

Primary Examiner—Mark R. Powell
Assistant Examiner—John Q. Chavis
(74) Attorney, Agent, or Firm—Duke W. Yee; Jeffrey S. LaBow; Michael R. Nichols

(57) ABSTRACT

A method and apparatus for executing bytecodes. Bytecodes are received for execution and a determination is made as to whether the bytecodes should be compiled. The bytecodes are sent to a just in time compiler responsive to a determination that the method should be compiled. The bytecodes form a method, and the method is sent to an interpreter, responsive to an absence of a determination that the method should be compiled.

18 Claims, 3 Drawing Sheets

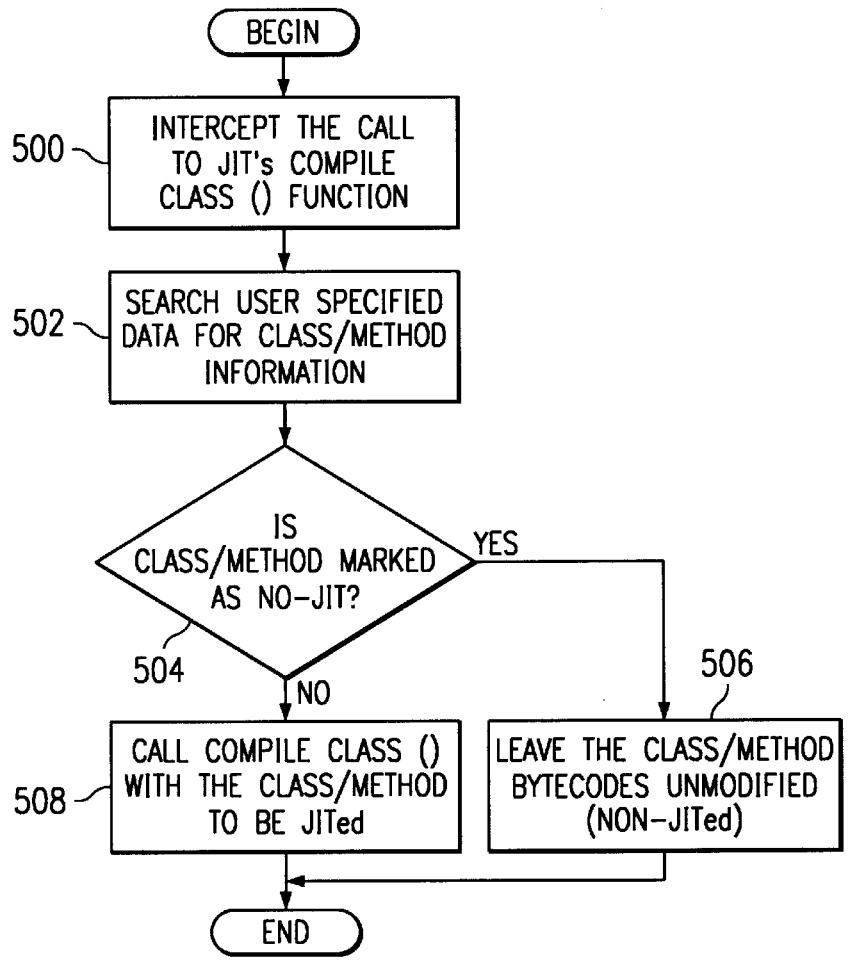

METHOD AND APPARATUS TO SELECTIVELY CONTROL PROCESSING OF A METHOD IN A JAVA VIRTUAL MACHINE

CROSS REFERENCE TO RELATED APPLICATIONS

The present invention is related to applications entitled A Method and Apparatus to Coordinate and Control the Simultaneous Use of Multiple Just In Time Compilers with a Java Virtual Machine, Ser. No. 09/204,513, Method and Apparatus for Automatic Service of JIT Compiler Generated Errors, Ser. No. 09/204,511, Method and Apparatus for Dynamically Selecting Bytecodes for Just in Time Compiling in a User's Environment, Ser. No. 09/204,976, A Method and Apparatus for Dynamic Selection of which Bytecodes should be Just In Time Compiled, Ser. No. 09/204,519, JIT/Compiler Java Language Extensions to Enable Field Performance and Serviceability, Ser. No. 09,204,968, Dynamic Selection/Definition of which Class/Methods should or should not be JIT'ed Using Information Stored in a JAR File, Ser. No. 09/204,975, and Method and Apparatus for Dynamic Selection of Instructions for Compiling Using Tags, Ser. No. 09/204,516, all of which are field even date hereof, assigned to the same assignee, and incorporated herein by reference.

1. Technical Field

The present invention relates generally to an improved data processing system and in particular to an improved method and apparatus for processing a method in a Java virtual machine. Still more particularly, the present invention relates to a method and apparatus for selectively controlling just in time compilation of a method.

2. Description of Related Art

Java is an object oriented programming language and environment focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java virtual machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format -the compiled code is executable on many processors, given the presence of the Java run time system. The Java compiler generates bytecode instructions that are nonspecific to a particular computer architecture. A bytecode is a machine independent code generated by the Java compiler and executed by a Java interpreter.

When extra speed in executing a Java program or applets is needed, a just in time (JIT) compiler may be used to translate bytecodes for a method or class into native machine instructions before executing them. Typically, this compilation only occurs once per method. Some JIT compilers may compile entire classes, rather than one method at a time.

In some situations, a JIT compiler may produce invalid results when compiling bytecodes from a given method of a class into instructions or machine code for execution on the computer. These errors do not occur if the code is not just in time compiled. Typically, these errors in execution of native instructions occur as a result of faulty logic in the JIT compiler. Currently, a mechanism for avoiding these errors is unavailable.

Therefore, it would be advantageous to have an improved method and apparatus for just in time compiling of methods.

SUMMARY OF THE INVENTION

The present invention provides a method and apparatus for executing bytecodes. Bytecodes are received for execution and a determination is made as to whether the bytecodes should be compiled. The bytecodes are sent to a just in time compiler responsive to a determination that the method should be compiled. The bytecodes form a method, and the method is sent to an interpreter, responsive to an absence of a determination that the method should be compiled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used to determine whether a method should be just in time compiled in accordance with a preferred embodiment of the present invention; and FIG. 6 is an example of a data structure containing user specified data for class/method information in accordance with a preferred embodiment of the present invention.

DETAILED DESCRIPTION OF THE PREFERRED EMBODIMENT

Figure 1:
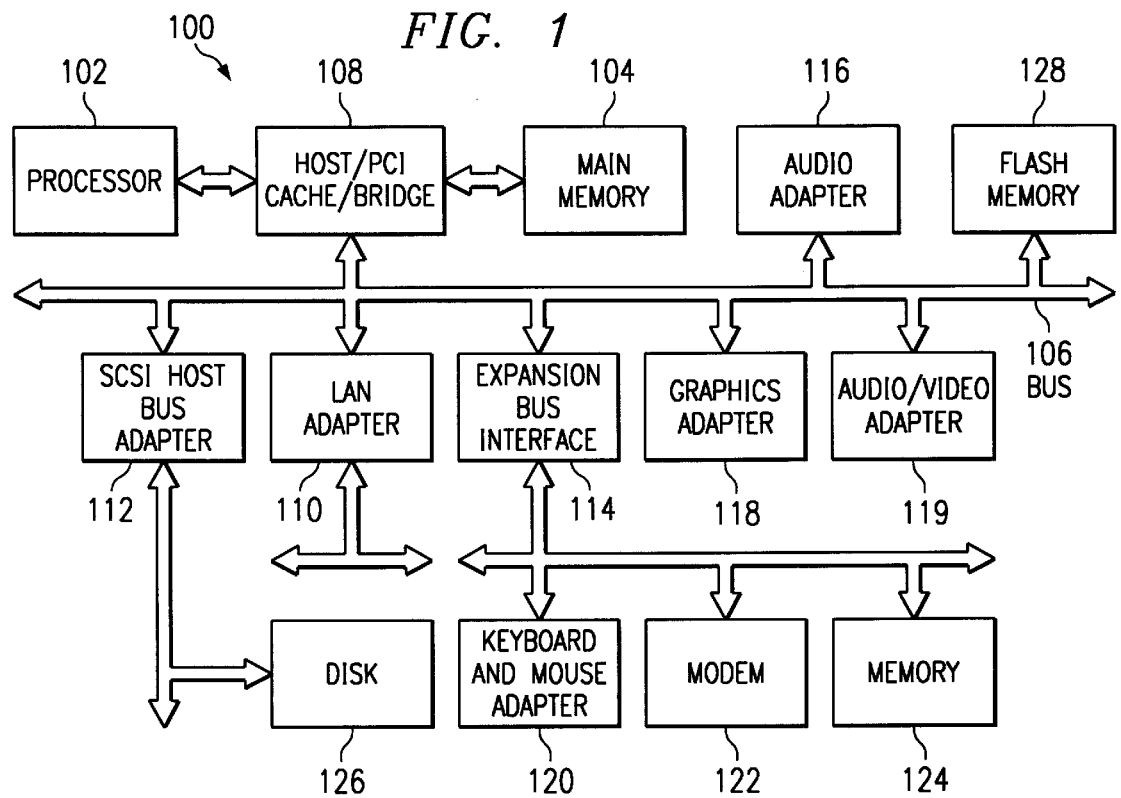
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CDROM drive 130 in the depicted example. Typical PCI local bus implementations will support three or four PCI expansion slots or add-in connectors. An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing system.

The present invention provides a method, apparatus, and instructions for selecting which methods are to be just in time compiled, also referred to as being "JITed". The mechanism of the present invention includes an interface that receives a call to just in time compile or "JIT compile" a method that is normally intended for the just in time (JIT) compiler. A determination is made as to whether to send the method to the JIT compiler. In the depicted example, the method is compared to a database or data structure containing information about methods that are known to produce invalid results or errors when these methods are JITed. If the method is to be JITed, the method is then passed by the interface on to the JIT compiler. Otherwise, the method might be returned to the interpreter in the JVM for processing. Alternatively, the processing of the method may be terminated.

Figure 2:
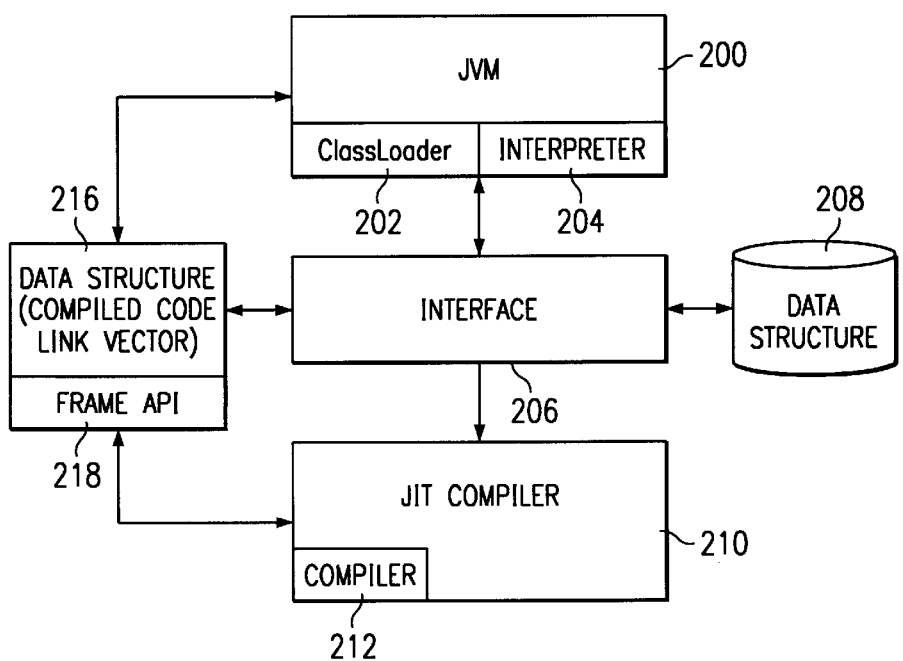
FIG. 2 is a diagram of components used to selectively process methods in accordance with a preferred embodiment of the present invention.

With reference now to FIG. 2, a diagram of components used to selectively process methods are depicted in accordance with a preferred embodiment of the present invention. In this example, JVM 200 includes a class loader 202 and interpreter 204. Interface 206 is the component containing the mechanism and process of the present invention. Data structure 208 is used by interface 206 to determine whether or not to JIT compile a method. Also shown in FIG. 2 is JIT compiler 210, which includes a compiler unit 212. JVM 200 and JIT compiler 210 contain other components, which are not shown to avoid obscuring the description of the present invention.

JVM 200 will start execution by invoking a method of a specified class. In the depicted example, this method may be for example, main. The method may be passed a single argument in the form of an array of strings. This causes the specified class to be loaded, linked to other types that it uses, and initialized. The loading of a class involves finding the binary form of a class or interface type with a particular name. In the depicted example, the loading process is implemented by class loader 202. Class loader 202 in this example includes a ClassLoader class, which includes methods for loading new classes into the Java runtime environment. Interpreter 204 is a program that translates a bytecode to a native instruction and then executes the native instructions. The bytecode is translated into a form executable by the computer on which the JVM is located.

JIT compiler 210 includes a compiler unit 212 incorporating a compiler class, which includes methods for compiling methods to native instructions prior to execution. In this example, the compilation occurs only once per method. Some JIT compilers may compile entire, classes, rather than one method at a time. A specific class or method may be compiled by passing an instance of the method or class to compiler unit 212 in JIT compiler 210.

Interface 206 receives the call or passing of the method destined for JIT compiler 210. Interface 206 may receive or intercept the method being passed to JIT compiler 210 by registering itself as a JIT compiler that is to receive the method in place of JIT compiler 210. The method is received from JVM 200 by interface 206 through a compile class API invoked by interpreter 204 in JVM 200. Interface 206 takes the method information received from class loader 202 and determines whether or not to JIT compile the method. This determination may be made by comparing the method name to a list or table of methods in a data structure 208 containing information about methods that produce invalid results or errors when JITed. This data structure may contain information for a specific JIT compiler, such as JIT compiler 210. If the method is to be JITed, the method is then passed on to JIT compiler 210. Otherwise, interface 206 may place a call to have interpreter 204 interpret the method. Alternatively, processing of the method may be terminated.

In addition, the mechanism of the present invention in interface 206 allows for access to Java stack frames in a stack. Without interface 206, Java stack frames are inaccessible in some JVMs, such as the JVM for OS/2, which is available from International Business Machines Corporation. Such access may typically be used for traversal and study to determine security permissions. The stack is available because a data structure containing information about functions for accessing the stack is passed to interface 206. In the depicted example, this data structure is a compiled code link vector 216. Typically, JVM 200 will generate compiled code link vector 216 and pass this data structure to JIT compiler 210. JIT compiler 210 may replace functions for actions listed in this data structure with its own version of the action.

When interface 206 receives compiled code link vector 216, the contents of the stack may be accessed through frame Application Programming Interface (API) 218, also referred to as FrameIntf—a function available in JVMs from International Business Machines Corporation, such as the JVM for OS/2, which is part of compiled code link vector 216. In this manner, when vector 216 with frame API 218 is hooked or received by interface 206, a shared library is created as a bridge between JVM 200 and JIT compiler 210.

In the depicted example, compiled code link vector 216 is intercepted or received by interface 206 using a forwarder dynamic link library (DLL), which is found in JVMs available from International Business Machines Corporation, such as, the IBM JVM for OS/2. JVM 200 employs a forwarder DLL to send compiled code link vector 216 to JIT compiler 210. JVM 200 uses the forwarder DLL as the just in time compiler. In this case, the call is sent to the forwarder DLL with interface 206 intercepting the call to the JIT compiler. At this point, compiled code link vector 216 may be used to access the stack and stack frames within the stack. In the depicted example, compiled code link vector 216 is a compiled code link vector which contains pointers to functions. Although the processes of the present invention are implemented in interface 206, the process could be implemented in other software components, such as, for example, in JVM 200.

Figure 3:
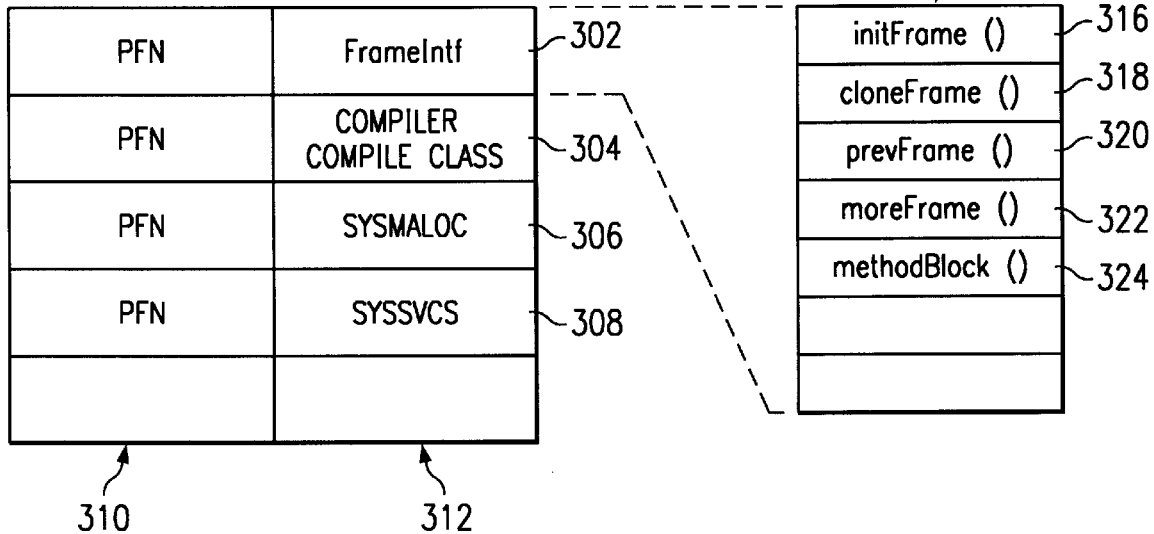
FIG. 3 is a diagram of the compiled code link vector in accordance with a preferred embodiment of the present invention.

Turning now to FIG. 3, a diagram of the compiled code link vector in FIG. 2 is depicted in accordance with a preferred embodiment of the present invention. Compiled code link vector 216 contains a number of entries 302–308. Each entry contains a pointer to a function (PFN) and an identification of the function. These pointers point to an address for the function. In addition, these pointers are replaceable in the depicted example so that a function called for an action may be changed by changing the PFN for an entry in compiled code link vector 300. For example, entry 302 in compiled code link vector 300 includes a PFN 310 for an action 312, which in this example is a frame interface function, FrameIntf. FrameIntf in entry 302 is actually a pointer to data structure 314, containing a number of PFNs that point to functions for traversing the Java stack and Java frames. For example, data structure 314 for FrameIntf includes the following functions: an initial frame function, initFrame () 316; clone frame function, cloneFrame (), 318; previous frame function, prevFrame(), 320; more frame function, moreFram (), 322; and method block function, methodBlock (), 324. Initial frame function 316 is used to initialize the FrameIntf structure with the top level frame being the current frame. Clone frame function 318 is employed to create a copy of the current frame so that the current frame can be stored. Next, previous frame function 320 is used to set the FrameIntf structure to point to the previous frame. More frame function 322 is employed to see if more frames are present in the stack, and method block function 324 is used to obtain the current method block out of the current frame. Example of code using the various FrameIntf function may be as follows:

```
//To traverse all of the stack frames until the end
//of the stack starting at the current frame
for (FrameIntf.init(ee, &trav); FrameIntf.more(&trav);
  FrameIntf.prev(&trav)))
{
  //does the method block of this frame match
  //pAFrame->methodblk?
  if (Frameintf.method(&trav)  !=pAFrame->methodblk)
     break;
}
```

In this manner, compiled code link vector 216 and its contents can be examined and analyzed. The forwarder DLL uses FrameIntf, found in IBM JVMs, to access stack frames in compiled code link vector 216 whether or not the stack frames have been JITed.

Figure 4:
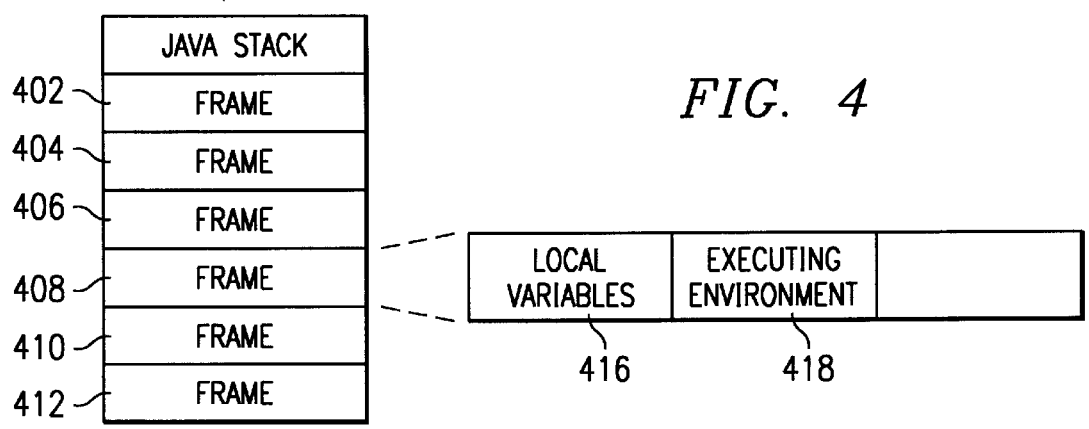
FIG. 4 is a diagram of a Java stack and JVM frame, manipulated using the processes of the present invention, in accordance with a preferred embodiment of the present invention.

Turning now to FIG. 4, a diagram of a Java stack and JVM frame, manipulated using the processes of the present invention, is depicted in accordance with a preferred embodiment of the present invention. Java stack 400 includes in the depicted example, JVM frames 402–412. Java stack 400 is an example of a stack that is intercepted by interface 206 in FIG. 2.

Each JVM has a Java stack, such as Java stack 400. Java stack 400 is created at the same time as the JVM. Java stack 400 is similar to the stack of a conventional language such as C because Java stack 400 holds local variables and partial results and also plays part in method invocation and return. The memory for Java stack 400 need not be contiguous. Each frame may include information regarding a method. In particular, a frame may store data and partial results as well allow for dynamic linking to return values for methods and to dispatch exceptions. A new frame is created each time a Java method is invoked. Frames are allocated from Java stack 400. In this example, frame 408 contains local variables 416 and executing environment 418. This executing environment may be in the form of an operand stack from which a JVM instruction may take values, operate on these values, and return results. Arguments may be passed to methods and results may be received from methods through the operand stack. All of the information within frames 402–412 may be made available for traversal and analysis when stack 400 is received by interface 206 in FIG. 2.

With reference now to FIG. 5, a flowchart of a process used to determine whether a method should be just in time compiled is depicted in accordance with a preferred embodiment of the present invention. The process begins by intercepting a call to the JIT compiler's compile class function (step 500). Thereafter, a search is made for users specified data for a particular class/method (step 502). This search may be made in a data structure containing information about various classes or methods. In particular, the information identifies methods that produce invalid results or errors when compiled by a JIT compiler. The information may be targeted to specific JIT compilers.

In FIG. 6, an example of a data structure containing user specified data for class/method information is depicted in accordance with a preferred embodiment of the present invention. Data structure 600 includes a number of entries 602–612 in which each entry identifies a class/method and an indication as to whether the method is to be JITed or not JITed. A "no-JIT", such as that found in entry 604 for class/method B indicates that the method should not be JITed. A determination is then made as to whether the class/method has been marked as no JIT (step 504). This determination is made by comparing the method to be JITed to data within a data structure, such as data structure 600 in FIG. 6. If the class/method is not to be JITed, then the class/method bytecodes are unmodified (step 506) with the process terminating thereafter. These bytecodes may then be sent to the interpreter for execution. Otherwise, the class/method to be JITed is sent to the JIT compiler by calling compile class (step 508) with the process terminating thereafter.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are nonspecific to a computer on which the instructions are to be executed. In such a case, a virtual machine on the computer may interpret the instructions or send the instructions to a compiler to generate code suitable for execution by the computer on which the virtual machine is located. The processes of the present invention also may be applied to selectively compiling instructions based on criteria other than the generation errors or exceptions. For example, selective compiling may be based on memory or speed. The process may be applied to entire classes, or individual methods or to paths in a method such a loop. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a data processing system for executing bytecodes comprising:

receiving bytecodes for execution;

responsive to a determination that the bytecodes should be compiled, sending the bytecodes to a just in time compiler;

responsive to an absence of a determination that the bytecodes should be compiled, sending the bytecodes to an interpreter;

comparing the bytecodes to information about a plurality of sets of bytecodes; and determining whether the bytecodes should be compiled based on the information about the plurality of sets of bytecodes.

2. The process of claim 1, wherein the bytecodes form a method.

3. The process of claim 1, wherein the step of receiving comprises:

intercepting a call to the compiler to process the bytecodes.

4. The process of claim 1, wherein the information about the plurality of sets of bytecodes is stored in a data structure.

5. The process of claim 1, wherein the information about the plurality of sets of bytecodes includes an identification of bytecodes that generate errors when sent to a just in time compiler.

6. A process in a data processing system for just in time compilation of a method in a Java virtual machine by a just in time compiler, the process comprising:

monitoring for a call to the just in time compiler to execute a method;

responsive to detecting the call, intercepting the call;

determining whether the method should be just in time compiled in response to intercepting the call;

responsive to a determination that the method should be just in time compiled, sending the method to the just in time compiler; and responsive to an absence of a determination that the method should be just in time compiled, halting execution of the method.

7. A method in a computer for executing instructions for a virtual machine running on the computer, the method comprising:

receiving an instruction for execution, wherein the instruction is nonspecific to the computer;

determining whether the instruction should be compiled into native code specific for the computer;

responsive to a determination that the instruction should be just in time compiled, sending the instructions to a compiler designed to generate native code specific for the computer; and responsive to an absence of a determination that the instruction should be just in time compiled, sending the instruction to an interpreter.

8. A method in a computer for accessing a stack used by a virtual machine and a compiler, the method comprising the computer implemented steps of:

intercepting a call passing the stack from the virtual machine to the compiler, wherein the call includes information used to access the stack; and using information to access the stack.

9. The method of claim 8, wherein the information comprises:

a plurality of pointers to a plurality of functions.

10. The method of claim 8, wherein the call is made using a forwarder dynamic link library.

11. A virtual machine for use in a computer, the virtual machine comprising:

a class loader, wherein the class loader loads a method for execution, wherein the method includes first instructions which are nonspecific to the computer;

a compiler, wherein the compiler generates second instructions executable by the computer;

an interpreter, wherein the interpreter performs each of the first instructions;

an interface, wherein the interface includes a plurality of modes of operations including:

a first mode of operation in which the interface receives the first instructions from the class loader destined for the compiler;

a second mode of operation, responsive to receiving the first instructions, in which the interface determines whether to send the first instructions to the compiler;

a third mode of operation, responsive to a determination that the first instructions are to be sent to the compiler, in which the interface sends the first instructions to the compiler; and a fourth mode of operation, responsive to an absence of a determination that the instructions are to be sent to the compiler, in which the interface sends the instructions to the interpreter; and a data structure, wherein the data structure contains information about methods, wherein the interface in the second mode of operation queries the data structure for information used to determine whether to send the first instructions to the compiler.

12. The virtual machine of claim 11, wherein the information about methods includes an identification of methods that generate errors when compiled by the compiler.

13. A data processing system for executing bytecodes comprising:

receiving means for receiving bytecodes for execution;

sending means, responsive to a determination that the bytecodes should be compiled, for sending the bytecodes to a just in time compiler;

comparing means for comparing the method to information about a plurality of sets of bytecodes;

determining means for determining whether the bytecodes should be compiled based on the information about the plurality of sets of bytecodes; and sending means, responsive to an absence of a determination that the bytecodes should be compiled, for sending the bytecodes to an interpreter.

14. The data processing system of claim 13, wherein the receiving means comprises:

intercepting means for intercepting a call to the compiler to process the bytecodes.

15. A data processing system for just in time compilation of a data processing system in a Java virtual machine by a just in time compiler, the data processing system comprising:

monitoring means for monitoring a call to the just in time compiler to executed a method;

intercepting means, responsive to detecting the call, for intercepting the call;

determining means for determining whether the method should be just in time compiled in response to intercepting the call;

sending means, responsive to a determination that the method should be just in time compiled, for sending the method to the just in time compiler; and halting means, responsive to an absence of a determination that the method should be just in time compiled, for halting execution of the method.

16. A data processing system in a computer for executing instructions for a virtual machine running on the computer, the data processing system comprising:

receiving means for receiving an instruction for execution, wherein the instruction is nonspecific to the computer;

sending means, responsive to a determination that the method should be just in time compiled, for sending the instructions to a compiler designed to generate native code specific for the computer;

comparing means for comparing the method to information about a plurality of methods;

determining means for determining whether the method should be compiled based on the information about the plurality of methods; and sending means, responsive to an absence of a determination that the method should be compiled, for sending the instructions to an interpreter.

17. A computer program product in a data processing system for executing bytecodes comprising:

first instructions for receiving bytecodes for execution;

second instructions, responsive to a determination that the bytecodes should be compiled, for sending the bytecodes to a just in time compiler;

third instructions for comparing the bytecodes to information about a plurality of sets of bytecodes;

fourth instructions for determining whether the bytecodes should be compiled based on the information about the plurality of sets of bytecodes; and fifth instructions responsive to an absence of a determination that the bytecodes should be compiled, for sending the bytecodes to an interpreter.

18. A computer program product in a data processing system for just in time compilation of a computer program product in a Java virtual machine by a just in time compiler, the computer program product comprising:

first instructions for monitoring a call to the just in time compiler to execute a method;

second instructions for responsive to detecting the call, intercepting the call;

third instructions, responsive to a determination that the method should be just in time compiled, for sending the method to the just in time compiler;

fourth instructions for comparing the method to information about a plurality of methods;

fifth instructions for determining whether the method should be just in time compiled based on the information about the plurality of methods; and sixth instructions responsive to an absence of a determination that the method should be just in time compiled, for sending the method to an interpreter.

* * * * *

UNITED STATES PATENT AND TRADEMARK OFFICE
CERTIFICATE OF CORRECTION

PATENT NO. : 6,324,687 B1
DATED : November 27, 2001
INVENTOR(S) : Beadle et al.

Page 1 of 1

It is certified that error appears in the above-identified patent and that said Letters Patent is hereby corrected as shown below:

Title page,
Attorney, Agent, or Firm, "Jeffrey S. LaBow" should read -- Jeffrey S. LaBaw --;

Column 1,
Line 19, "09,204,968" should read -- 09/204,968 --;

Column 9,
Line 13, after "to", delete "executed" and insert -- execute --.

Signed and Sealed this

Nineteenth Day of March, 2002

Attest:

JAMES E. ROGAN
*Attesting Officer*     *Director of the United States Patent and Trademark Office*